United States Patent
Li et al.

(10) Patent No.: US 11,752,543 B2
(45) Date of Patent: Sep. 12, 2023

(54) MELT FLOW RATE ADJUSTMENT SYSTEM AND METHOD OF MULTI-COMPONENT RADIAL FUNCTIONAL-GRADIENT-MATERIAL EQUIPMENT

(71) Applicant: University of Science and Technology Beijing, Beijing (CN)

(72) Inventors: Jingyuan Li, Beijing (CN); Shang Dai, Beijing (CN); Chen Cai, Beijing (CN); Mingfan Qi, Beijing (CN); Jinbo Gu, Beijing (CN); Jianxin Xie, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 17/639,901

(22) PCT Filed: Nov. 25, 2021

(86) PCT No.: PCT/CN2021/133274
§ 371 (c)(1),
(2) Date: Mar. 2, 2022

(87) PCT Pub. No.: WO2022/078528
PCT Pub. Date: Apr. 21, 2022

(65) Prior Publication Data
US 2022/0362839 A1  Nov. 17, 2022

(30) Foreign Application Priority Data
Dec. 31, 2020  (CN) .......................... 202011635952.2

(51) Int. Cl.
*B22D 13/02* (2006.01)
*B22D 13/10* (2006.01)
(Continued)

(52) U.S. Cl.
CPC ............. *B22D 13/02* (2013.01); *B22D 13/04* (2013.01); *B22D 13/107* (2013.01); *B22D 13/12* (2013.01);
(Continued)

(58) Field of Classification Search
CPC .... B22D 13/02; B22D 13/023; B22D 13/107; B22D 13/12; B29C 41/04; B29C 41/042; B29C 41/36
See application file for complete search history.

(56) References Cited

U.S. PATENT DOCUMENTS 4,536,455 A * 8/1985 Maeda ................... B22D 13/02
138/143
2019/0054521 A1* 2/2019 Li ........................... B33Y 30/00

FOREIGN PATENT DOCUMENTS

CN  105954074 A  9/2016

OTHER PUBLICATIONS

Lin et al, Fabrication of Al—Si—Mg functionally graded materials tube reinforced with in situ Si/Mg2Si particles by centrifugal casting, available online Sep. 2012, Composites: Part B 45 (2013) 8-21. (Year: 2012).*
(Continued)

*Primary Examiner* — Kevin E Yoon
*Assistant Examiner* — Jacky Yuen
(74) *Attorney, Agent, or Firm* — Modal PLLC

(57) ABSTRACT

A screw smelting machine melts raw materials with a different chemical ratio in a mixing funnel in a feeding order to prevent the long-range diffusion of a melt, and controls outflow at a suitable speed. A centrifugal casting machine solidifies the melt with the ingredients gradient varying into a radial ingredient gradient material by a centrifugal casting style. A temperature sensor monitors temperature of an outer surface of a centrifuge cavity of the centrifugal casting
(Continued)

machine during centrifugal casting, and transmits the temperature to a control platform. The control platform determines an optimal flow rate of the melt at an end of screw rod according to ingredient gradient of ingredient radial-gradient pipe materials and a thickness of each component gradient material required with preparation, in combination with a real-time data fed back from the temperature sensor, and feeds back to a feeding end.

2 Claims, 3 Drawing Sheets

(51) Int. Cl.
*B22D 13/12* (2006.01)
*B29C 41/04* (2006.01)
*B29C 41/36* (2006.01)
*B22D 13/04* (2006.01)
*B29C 39/08* (2006.01)
*B29C 39/22* (2006.01)
*C03B 19/02* (2006.01)

(52) U.S. Cl.
CPC .............. *B29C 39/08* (2013.01); *B29C 39/22* (2013.01); *B29C 41/04* (2013.01); *B29C 41/36* (2013.01); *C03B 19/02* (2013.01)

(56) References Cited

OTHER PUBLICATIONS

Notification of First Office Action in corresponding CN App. No. 202011635952.2, dated Oct. 9, 2021, 21 pages.
Baosen Qi, et al., Applications of New Materials, Sep. 2007, pp. 149-155, Harbin Institute of Technology Press.

* cited by examiner

MELT FLOW RATE ADJUSTMENT SYSTEM AND METHOD OF MULTI-COMPONENT RADIAL FUNCTIONAL-GRADIENT-MATERIAL EQUIPMENT

CROSS-REFERENCE TO RELATED APPLICATIONS

This application is the U.S. National Stage of International Application No. PCT/CN2021/133274, filed on Nov. 25, 2021, which claims priority to Chinese Patent Application No. 202011635952.2, filed on Dec. 31, 2020, the entire contents of both of which are incorporated herein by reference.

BACKGROUND

Field of Invention

The present invention belongs to the technical field of material processing and preparation, and specifically relates to a melt flow rate adjustment system and method of multi-component radial functional-gradient-material equipment for large-size multi-component pipe materials, rod materials, solid/hollow dishes, and disks with chemical ingredients of alloys, resins, glass and other materials continuously varying in a radial gradient.

Background of the Invention

In aerospace, nuclear fusion and other harsh service conditions, the ingredient-uniform materials cannot meet the requirement. In order to overcome the changing requirements of the material performance due to sudden changes in the environment, the composite materials have emerged. Traditional composite materials are prepared by hot pressing, welding and other methods. There are large differences between various parts of the material, and there are problems such as poor defect performance. Functional-gradient materials refer to a novel type of composite material with special functions, of which the composition, structure, porosity and other elements continuously vary from one side to the other, so that the physical, chemical, mechanical properties and other properties of the material are continuously varying to adapt to different environmental requirements. It is generally believed that the functional-gradient materials and parts cannot be prepared by conventional metallurgical methods. At present, functional-gradient materials are prepared mainly through vapor deposition, plasma spraying, magnetron sputtering, powder metallurgy, laser cladding, additive manufacturing and other methods. But the existing technology has the problems that the size of the prepared material is limited, the production cost is high and the efficiency is low, and it is prone to macro-cracking, and it is impossible to design the ingredients on demand.

BRIEF SUMMARY

The present invention discloses a melt flow rate adjustment system and method of multi-component radial functional-gradient-material equipment to solve any of the above-mentioned and other potential problems in the prior art.

In order to solve the above problems, the present invention discloses a melt flow rate adjustment system of multi-component radial functional-gradient-material equipment, the adjustment system includes a raw material storage tank, a mixing funnel, a screw smelting machine, a centrifugal casting machine, a temperature sensor and a control platform;

the raw material storage tank is used to store raw materials for preparing the multi-component radial gradient material;

wherein, for the feeding mechanism in the raw material storage tank, the rotation speed of the feeding mechanism can be regulated and controlled through the control platform, and the ratio of raw materials entering the funnel is changed by controlling the rotation speed of the feeding mechanism.

the mixing funnel is used to mix materials entering from the storage tank and control the raw materials to enter the screw smelting machine at different speeds; one end of the mixing funnel is connected to the raw material storage tank;

the screw smelting machine is used to melt the raw materials with a different chemical ratio in the mixing funnel in a feeding order to prevent the long-range diffusion of a melt, and to control outflow at a suitable speed; one end of the screw smelting machine is connected to the outlet of the mixing funnel;

wherein the screw rod in the screw smelting machine is close to the inner wall of the melting cavity and rotates vertically downwards, which can effectively avoid the mixed melting phenomenon caused by the long-range diffusion effect of the ingredient gradient continuously varying melt;

the centrifugal casting machine is used to solidify the melt with the ingredients gradient varying into pipe materials by a centrifugal casting style; one end of the centrifugal casting machine is connected with the outlet of the screw smelting machine; the outlet of the tail end of the screw smelting machine is provided with the flow rate control valve to adjust the melt flow rate.

the temperature sensor is used to monitor the temperature of the outer surface of centrifuge cavity of the centrifugal casting machine, and transmit the temperature to the control platform; the temperature sensor is disposed outside the centrifugal casting melting cavity;

the control platform is used to determine an optimal flow rate of the melt at an end of screw rod according to ingredient gradient of ingredient radial-gradient pipe materials and a thickness of each component gradient material required with preparation, in combination with a real-time data fed back from the temperature sensor, and to feedback to a feeding end.

Another object of the present invention is to provide a method for preparing a large-size multi-component radial functional-gradient material using the above-mentioned the adjustment system, the method specifically includes the following steps of:

S1) selecting the required raw materials according to ingredients and pipe wall thickness of the multi-component radial functional-gradient material prepared by design requirement, and putting each of the raw materials in each raw material storage tank for use, respectively;

S2) the control platform determining a flow rate V of the melt by mathematical model according to the ingredients and pipe wall thickness of the multi-component radial functional-gradient material prepared by requirement, the melt instantly solidifying when entering at the flow rate;

S3) the mixing funnel receiving the control platform instruction, batching according to the ingredients and pipe wall thickness of the multi-component radial functional-gradient material, and mixing evenly, and then delivering the raw materials to the screw smelting machine;

S4) the raw materials entering a melting cavity of the screw smelting machine, being separating by the screw rod that is close to the inner wall of the melting cavity and rotates vertically downwards for performing gradient melting, the control platform regulating and controlling melting temperature and rotation speed R of the screw rod to make the melt with ingredients continuously varying being transferred to the centrifugal casting machine at the optimal centrifugal pouring speed, that is, the melt flow rate V;

S5) the melt entering a centrifugal casting machine at the flow rate V, and then filling quickly and solidifying quickly in the melting cavity under the action of centrifugal force, in combination with a water-cooling device outside the casting cavity to achieve an efficient production mode of instant solidification when entering to prevent the melt from mixing, preparing a functional-gradient pipe material with ingredients continuously varying.

Further, the mathematical model and specific algorithms in S2) are:

S2.1) measuring and calculating bulk density $\rho_j'$ according to density of each of the raw materials, j=A, B, C . . . N, representing various ingredient castings, and the unit of $\rho_j'$: g/cm$^3$, S2.2) determining temperatures $T_{ij}$, ij=OA, AB, BC . . . NS , of an interface between the casting mold and the casting, an interface between various ingredient castings interfaces, and an interface between the casting and internal environment of the centrifuge cavity during an unstable heat conduction process in a casting cavity, according to basic equation of heat conduction theory of solid interior, i.e., Fourier equation, O is the casting mold material, that is, the centrifuge cavity, S is internal environment of the centrifuge cavity, the formula is as follows:

$$T_{ij} = \frac{b_i T_{i0} + b_j T_{j0}}{b_i + b_j}, \quad (1)$$

In the formula, $b_i$ and $b_j$ are heat storage coefficients of the casting mold (including the solidified layer casting) and the casting, respectively, and $T_{i0}$ and $T_{j0}$ are an initial temperatures of casting mold (real-time transmitted by the temperature sensor) and an initial temperature of casting (approximately being the casting pouring temperature), respectively;

S2.3) determining a relationship between solidification thickness and pouring time, according to heat flow relationship and energy conservation relationship in a heat exchange process, the formula is as follows:

$$d\xi = \frac{\rho_j'\sqrt{\pi}\left[C_j'(T_{j0} - T_{jS})\right] + L_j'}{2\tau^2(b_j + b_S)(T_{ij} - T_{j0})}d\tau, \quad (2);$$

In the formula, $b_S$ is heat storage coefficient of internal environment of the centrifuge cavity, $T_{s0}$ is an initial temperature of internal environment of the centrifuge cavity, $C_j'$ and $L_j'$ are an actual specific heat capacity and an actual crystallization latent heat of the mixed multi-component gradient material of each layer, $T_{jS}$ is an actual liquidus temperature of each ingredient melt;

S2.4) the following assumptions are made for the melt entering the centrifuge cavity. (1) The melt is filled instantaneously after entering the melting cavity and does not flow relative to the mold wall after the filling is completed, that is, the convective heat transfer conditions are ignored. (2) The melt flow rate is calculated based on instant-solidification-when-melt-entering model, that is, the pouring speed just meets the solidification conditions. And the solidified material is partially melted due to the crystallization latent heat released by the new entering materials. In summary, the relationship of the melt flow rate and the ingredient gradient continuously varying material and time is calculated, and the formula is as follows.

$$V = \frac{\rho_j'\sqrt{\pi}\left[C_j'(T_{j0} - T_{jS}) + L_j'\right]A(\tau)}{2\tau^2(b_j + b_S)(T_{ij} - T_{j0})A_{runner}}, \quad (3)$$

In the formula, $A(\tau)$ is an internal surface area of the pipe wall at time $\tau$, and $A_{runner}$ is a cross-sectional area of the runner, $T_{ij}$ is given by formula (1);

the rotation speed R of the screw rod in S4) is determined by the following formula, which is as follows:

$$R = \frac{\rho_j'\sqrt{\pi}\left[C_j'(T_{j0} - T_{jS}) + L_j'\right](D_e^2\cos\Phi)A(\tau)}{2\tau^2(b_j + b_S)(T_{ij} - T_{j0})(D_B^2 - D_S^2)B \cdot A_{runner}}, \quad (4)$$

in the formula, R is a rotation speed of the screw rod; $\Phi$ is a helix angle of thread; $D_S$ is a diameter of the screw rod; $D_B$ is a diameter of sleeve-port; B is an axial distance among screw edges.

A large-size multi-component radial functional-gradient material, the multi-component radial functional-gradient-material is prepared by the above method.

The excellent effects of the present invention are as follows. Due to the above technical solution used, the present invention has the advantages of real-time feedback, flexible control, easy operation, etc. The device controls the raw material storage through the system to continuously transfer the raw materials to the mixer. After the raw materials in different proportions are evenly mixed in the mixer, and then continuously are transferred into the screw smelting furnace for sequential smelting by controlling the flow rate. The control platform controls the melt to enter the centrifugal casting machine at an optimal flow rate, and the melt fills quickly and solidifies under the action of centrifugal force, so as to realize the instant-solidification-when-entering conversion of the melt whose ingredients are continuously varying along the axial direction into the radial gradient materials. The method can realize the preparation of large-size pipe materials, rod materials, solid/hollow dishes, and disks with different compositions of alloys, resins, glass and other materials varying in a radial ingredient gradient, which simplifies the preparation process, reduces time costs, and improves the quality of finished products and the preparation efficiency.

Figure 1:
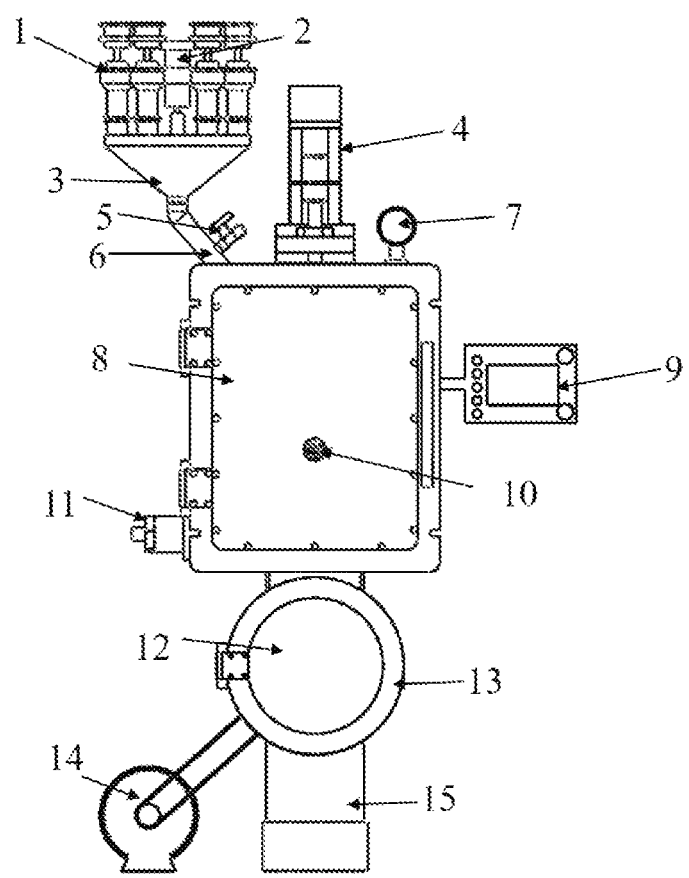
FIG. 1 is a schematic diagram of a melt flow rate adjustment system of radial ingredient gradient material of the present invention.

feeding mechanism 1, stirring mechanism 2, mixing funnel 3, lifting module 4, feeding valve 5, feed pipe 6, pressure gauge 7, water-cooled furnace door 8, control panel 9, water-cooled furnace door observation hole 10, vacuum sealing mechanism 11, centrifugal casting furnace door observation window 12, centrifugal casting furnace door 13, electric motor 14, vacuum machine 15, screw rod 16, double-layer water-cooled vacuum cavity 17, heating coil 18, flow rate control valve 19, crucible 20, water spray device 21, casting mold front cover 22, temperature sensor 23, centrifuge cavity 24, centrifugal casting mold 25, upper duct 26, lower duct 27.

DETAILED DESCRIPTION OF THE EMBODIMENTS

The principles, technical solutions and advantages of the present invention are further described in detail and fully clarified below in combination with the drawings.

Figure 2:
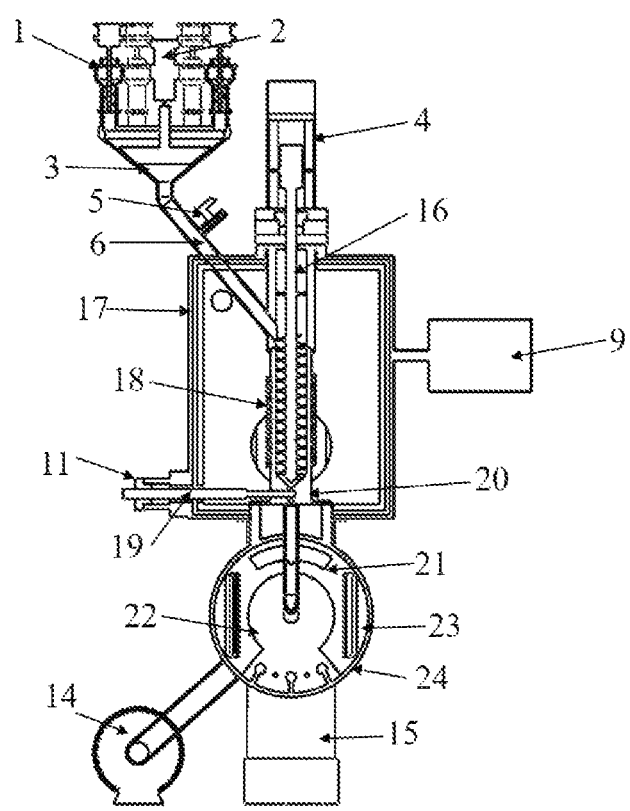
FIG. 2 is a front sectional view of a melt flow rate adjustment system of radial ingredient gradient material of the present invention.
Figure 3:
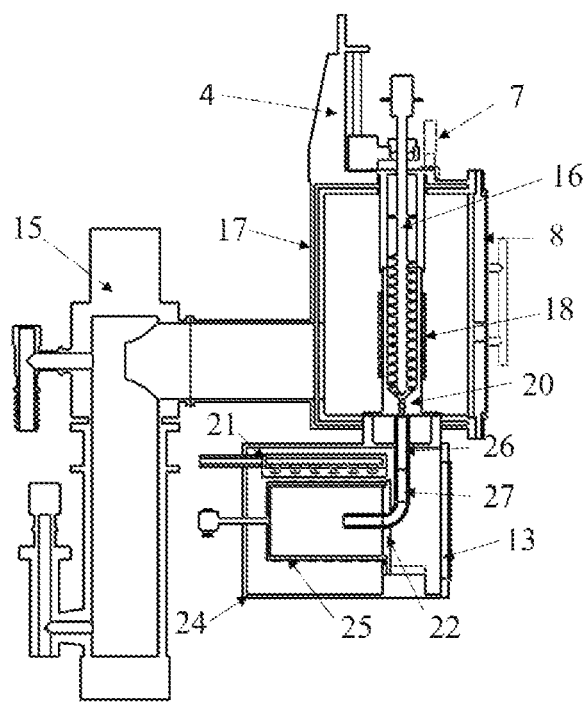
FIG. 3 is a side sectional view of a melt flow rate adjustment system of radial ingredient gradient material of the present invention.

As shown in FIGS. 1-3, the present invention is a melt flow rate adjustment method of radial ingredient gradient material.

The adjustment system includes the raw material storage tank, the mixing funnel, the screw smelting machine, the centrifugal casting machine, the temperature sensor and the control platform.

The raw material storage tank is used to store raw materials for preparing the multi-component radial gradient material.

Wherein, for the feeding mechanism 1 in the raw material storage tank, the rotation speed of the feeding mechanism can be regulated and controlled through the control platform, and the ratio of raw materials entering the funnel is changed by controlling the rotation speed of the feeding mechanism.

The mixing funnel is used to mix materials entering from the storage tank through the stirring mechanism 2 and control the raw materials to enter the screw smelting machine at different speeds through the feeding valve 5. One end of the mixing funnel is connected to the raw material storage tank.

The screw smelting machine is used to melt the raw materials with a different chemical ratio in the mixing funnel in a feeding order to prevent the long-range diffusion of the melt, and to control the outflow of melt at a suitable speed by the lifting module 4. One end of the screw smelting machine is connected to the feed pipe 6.

Wherein, the raw materials are melted under the induction heating of heating coil 18. The screw rod 16 is close to the inner wall of the melting cavity and rotates vertically downwards, which can effectively avoid the mixed melting phenomenon caused by the long-range diffusion effect of the ingredient gradient continuously varying melt.

The centrifugal casting machine includes a casting mold front cover 22, a centrifuge cavity 24, a centrifugal casting mold 25. The centrifugal casting machine is used to solidify the melt with the ingredients gradient varying into pipe materials by a centrifugal casting style. One end of the centrifugal casting machine is connected with an upper duct 26 and a lower duct 27.

Wherein, the centrifuge cavity 24 contains a water spray device 21. Under the action of the water spray device 21, the outer wall of the centrifugal casting mold 25 is rapidly cooled, and the temperature gradient of the casting and casting mold is increased to provide the driving force for the casting solidification. In addition, the spraying speed is effectively controlled through the control platform to adjust the casting solidification speed.

The temperature sensor 23 is used to monitor the temperature of the outer surface of the centrifugal casting mold 25, and transmit the temperature to the control platform. The temperature sensor is disposed in the centrifuge cavity 24.

The control platform includes a lifting module 4, a feeding valve 5, a control panel 9, a flow rate control valve 19. The control platform is used to determine an optimal flow rate of the melt at an end of screw rod according to ingredient gradient of ingredient radial-gradient pipe materials and a thickness of each component gradient material required with preparation, in combination with a real-time data fed back from the temperature sensor, and to feedback to the feeding end.

Wherein, the control platform controls the lifting module 4, the feed valve 5, and the flow rate control valve 19 based on the mathematical model and real-time data fed back by the temperature sensor 23 to make the melt enter the centrifugal casting machine with the optimal flow rate calculated by the mathematical model to guarantee the continuous solidification of the ingredient gradient continuously varying material.

Another object of the present invention is to provide a method for preparing a large-size multi-component radial functional-gradient material using the above-mentioned adjustment system and the method specifically includes the following steps of:

S1) selecting the required raw materials according to the ingredients and pipe wall thickness of the multi-component radial functional-gradient material prepared by design requirement, and putting each of the raw materials in each raw material storage tank for use, respectively;

S2) the control platform determining a flow rate V of the melt by mathematical model according to the ingredients and pipe wall thickness of the multi-component radial functional-gradient material prepared by requirement, the melt instantly solidifying when entering at the flow rate;

S3) the mixing funnel receiving the control platform instruction, batching according to the ingredients and pipe wall thickness of the multi-component radial functional-gradient material, and mixing evenly, and then delivering the raw materials to the screw smelting machine;

S4) the raw materials entering a melting cavity of the screw smelting machine, being separating by the screw rod that is close to the inner wall of the melting cavity and rotates vertically downwards for performing gradient melting, the control platform regulating and controlling melting temperature and rotation speed R of the screw rod to make the melt with ingredients continuously varying being transferred to the centrifugal casting machine at the optimal centrifugal pouring speed, that is, the melt flow rate V;

S5) the melt entering a centrifugal casting machine at the flow rate V, and then filling quickly and solidifying quickly in the melting cavity under the action of centrifugal force, in combination with a water-cooling device outside the casting cavity to achieve an efficient production mode of instant solidification when entering to prevent the melt from mixing, preparing a functional-gradient pipe material with ingredients continuously varying.

The mathematical model and specific algorithms in S2) are as follows:

S2.1) measuring and calculating bulk density $\rho_j'$ according to density of each of the raw materials, j= A, B, C ... N, unit: g/cm³, S2.2) determining temperatures $T_{ij}$, ij=OA, AB, BC ... NS (representing interfaces between a casting and a casting mold, and between each casting), of an interface between the casting mold and the casting, an interface between various ingredient casting interfaces, and an interface between the casting and internal environment of the centrifuge cavity during an unstable heat conduction process in a casting cavity, according to basic equation of heat conduction theory of solid interior, that is, Fourier equation, the formula is as follows:

$$T_{ij} = \frac{b_i T_{i0} + b_j T_{j0}}{b_i + b_j}, \quad (1)$$

In the formula, $b_i$ and $b_j$ are heat storage coefficients of the casting mold (including the solidified layer casting) and the casting, respectively, and $T_{i0}$ and $T_{j0}$ are an initial temperatures of casting mold (real-time transmitted by the temperature sensor) and an initial temperature of casting (approximately being the casting pouring temperature), respectively;

S2.3) determining a relationship between solidification thickness and pouring time, according to heat flow relationship and energy conservation relationship in a heat exchange process, the formula is as follows:

$$d\xi = \frac{\rho_j'\sqrt{\pi}\left[C_j'(T_{j0} - T_{jS})\right] + L_j'}{2\tau^2(b_j + b_S)(T_{ij} - T_{j0})}d\tau, \quad (2);$$

In the formula, $b_s$ is heat storage coefficient of internal environment of the centrifuge cavity, $T_{s0}$ is an initial temperatures of internal environment of the centrifuge cavity, $C_j'$ and $L_j'$ are an actual specific heat capacity and an actual crystallization latent heat of the mixed multi-component gradient material of each layer, $T_{jS}$ is an actual liquidus temperature of each ingredient melt, $d\xi$ is the solidification thickness;

S2.4) The following assumptions are made for the melt entering the centrifuge cavity. (1) The melt is filled instantaneously after entering the melting cavity and does not flow relative to the mold wall after the filling is completed, that is, the convective heat transfer conditions are ignored. (2) The melt flow rate is calculated based on instant-solidification-when-melt-entering model, that is, the pouring speed just meets the solidification conditions. And the solidified material is partially melted due to the crystallization latent heat released by the new entering materials. In summary, the relationship of the melt flow rate and the ingredient gradient continuously varying material and time is calculated, and the formula is as follows.

$$V = \frac{\rho_j'\sqrt{\pi}\left[C_j'(T_{j0} - T_{jS}) + L_j'\right]A(\tau)}{2\tau^2(b_j + b_S)(T_{ij} - T_{j0})A_{runner}}, \quad (3)$$

In the formula, $A(\tau)$ is an internal surface area of the pipe wall at time $\tau$, and $A_{runner}$ is a cross-sectional area of the runner, $\tau_{ij}$ is given by formula (1);

the rotation speed R of the screw rod in S4) is determined by the following formula, which is as follows:

$$R = \frac{\rho_j'\sqrt{\pi}\left[C_j'(T_{j0} - T_{jS}) + L_j'\right](D_e^2\cos\Phi)A(\tau)}{2\tau^2(b_j + b_S)(T_{ij} - T_{j0})(D_B^2 - D_S^2)B \cdot A_{runner}}, \quad (4)$$

in the formula, R is a rotation speed of the screw rod; $\Phi$ is a helix angle of thread; $D_S$ is a diameter of the screw rod; $D_B$ is a diameter of sleeve-port; B is an axial distance among screw edges, De is the entrance diameter of the materials.

A large-size multi-component radial functional-gradient material, the multi-component radial functional-gradient-material is prepared by the above method.

The melt flow rate adjustment system and method of the multi-component radial functional-gradient-material equipment provided by the examples of the present application are described in detail above. The description of the above examples is only used to help understanding the method and core ideas of the present application. At the same time, according to the ideas of this application, those skilled in the art will all have changes in the specific implementation and application scope. In summary, the contents of this specification should not be construed as a restriction on the present application.

If certain words are used in the specification and claims to refer to specific elements, those skilled in the art should understand that hardware manufacturers may use different terms to refer to the same element. The present specification and claims do not use name difference as a way to distinguish elements, but the difference in function of the elements is used as a criterion for distinguishing.

As mentioned in the entire specification and claims, "contain", "include" are open terms, they should be interpreted as "contain/include, but not limited to". "Approximately" means that within the acceptable error range, those skilled in the art can solve the technical problem within a certain error range, and basically achieve the technical effect. The subsequent description of the specification is a preferred embodiment for implementing the present application, but the description is for the purpose of explaining the general principles of the present application, and is not intended to limit the scope of the present application. The protection scope of the present application shall be as defined by the appended claims.

It should also be noted that the terms "include", "contain" or any other variant thereof are intended to cover non-exclusive inclusion, so that a commodity or system that includes a series of elements not only includes those elements, but also includes other elements that are not explicitly listed, or also include elements inherent to this commodity or system. In the case of no more restrictions, the elements defined by the sentence "including a ... " are not excluded that there are other identical elements in the commodity or system that includes the said elements.

It should be understood that the term "and/or" used in the present application is only an associated relationship that describes associated objects, indicating that there is three types of relationships. For example, A and/or B can indicate three situations: the existence of A alone, the existence of A and B at the same time, and the existence of B alone. In addition, the character "/" in the present application generally means that the associated objects before and after are an "or" relationship.

The above description shows and describes several preferred examples of the present application, but as mentioned above, they should be understood that the present application is not limited to the form disclosed herein, and should not be regarded as exclusions of other examples. But they can be used to various other combinations, modifications and environments, and can be modified within the scope of the application concept described herein through the above-mentioned teaching or related field technology or knowledge. And the modifications and changes made by those skilled in the art do not depart from the spirit and scope of the present application, and all should be in the protection scope of the appended claims of the present application.

The invention claimed is:

1. An adjustment method of a melt flow rate adjustment system of multi-component radial functional-gradient-material equipment, characterized in that,
the adjustment system includes a raw material storage tank, a mixing funnel, a screw smelting machine, a centrifugal casting machine, a temperature sensor and a control platform, wherein,
the raw material storage tank is used to store raw materials for preparing the multi-component radial gradient material;
the mixing funnel is used to mix materials entering from the storage tank and control the raw materials to enter the screw smelting machine at different speeds;
the screw smelting machine is used to melt the raw materials with a different chemical ratio in the mixing funnel in a feeding order to prevent the long-range diffusion of a melt, and to control outflow at a suitable speed;
the centrifugal casting machine is used to solidify the melt into a radial functional gradient material by a centrifugal casting style;
the temperature sensor is used to monitor temperature of an outer surface of a centrifuge cavity of the centrifugal casting machine during centrifugal casting, and transmit the temperature to the control platform;
the control platform is used to determine an optimal flow rate of the melt at an end of a screw rod in combination with real-time data fed back from the temperature sensor, and to feedback to a feeding end;
the method specifically includes the following steps of:
S1) selecting the required raw materials according to ingredients and pipe wall-thickness of the multi-component radial functional-gradient-material prepared by design requirement, and putting each of the raw materials in each raw material storage tank for use, respectively;
S2) the control platform determining a flow rate V of the melt according to the ingredients and pipe wall-thickness of the multi-component radial functional-gradient pipe material prepared by requirements, and transmitting the flow rate V to the mixing funnel, the screw smelting machine and the centrifugal casting machine;
S3) the mixing funnel receiving a control platform instruction, batching according to the ingredients and pipe wall-thickness of the multi-component radial functional-gradient pipe material, and mixing evenly, and then delivering the raw materials to the screw smelting machine;
S4) the raw materials entering a melting cavity of the screw smelting machine, being separated by the screw rod that is close to an inner wall of the melting cavity and rotates vertically downwards for performing gradient melting, the control platform regulating and controlling melting temperature and rotation speed R of the screw rod to make the melt with ingredients continuously varying being transferred to the centrifugal casting machine at an optimal centrifugal pouring speed, that is, the melt flow rate V;
the rotation speed R of the screw rod in S4) is determined by the following formula (4), which is as follows:

$$R = \frac{\rho'_j \sqrt{\pi} \left[ C'_j (T_{j0} - T_{jS}) + L'_j \right] (D_e^2 \cos\Phi) A(\tau)}{2\tau^2 (b_j + b_S)(T_{ij} - T_{j0})(D_B^2 - D_S^2) B \cdot A_{runner}}, \quad (4)$$

in the formula,
R is a rotation speed of the screw rod, $\Phi$ is a helix angle of thread,
$D_S$ is a diameter of the screw rod, $D_B$ is a diameter of sleeve-port; B is an axial distance among screw edges, and De is a diameter of feeding port,
$\rho_j'$ is bulk density according to density of each of the raw materials, j=A, B, C . . . N, representing various ingredient castings, and the unit of $\rho_j'$: g/cm³,
$b_j$ is heat storage coefficients of the casting,
$b_s$ is heat storage coefficient of internal environment of the centrifuge cavity,
$C_j'$ and $L_j'$ are an actual specific heat capacity and an actual crystallization latent heat value of mixed multi-component gradient material of each layer, respectively,
$T_{jo}$ is an initial temperature of casting; $T_{jS}$ is an actual liquidus temperature of each ingredient melt,
$T_{ij}$ is temperatures of an interface between a casting mold and the casting, an interface between various ingredient casting interfaces, and an interface between the casting and internal environment of the centrifuge cavity during an unstable heat conduction process in a casting cavity,
ij=OA, AB, BC . . . NS, O is the casting mold material, S is internal environment of the centrifuge cavity, and
$A(\tau)$ is an internal surface area of the pipe wall at time $\tau$, and $A_{runner}$ is a cross-sectional area of a runner, and
S5) the melt entering the centrifugal casting machine at the flow rate V, and then filling and solidifying in the casting cavity under the action of centrifugal force, in combination with a water-cooling device outside the casting cavity to achieve an efficient production mode of instant solidification when entering to prevent the melt from mixing, a thereby forming the multi-component radial functional-gradient material with ingredients continuously varying.

2. The method according to claim 1, characterized in that, in the S1), the raw materials are metals, alloys, resins or glass, and a particle size is less than 20 mm, and a number is multiple.

* * * * *